Figure 31:
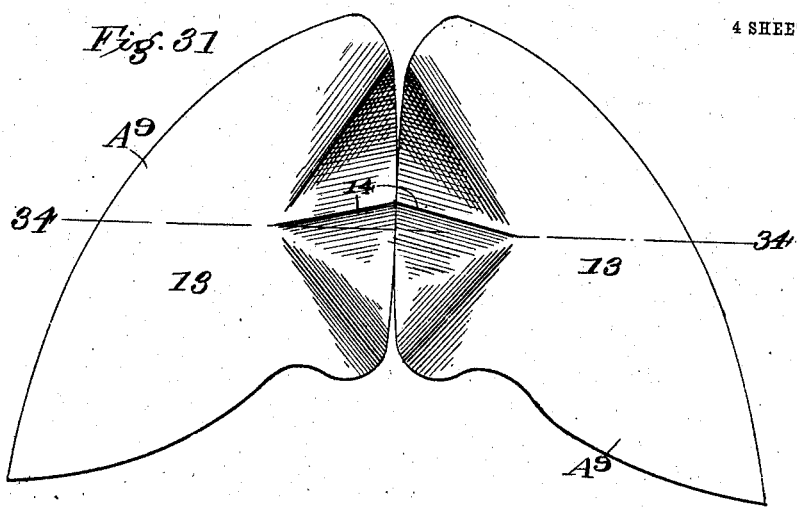

No. 846,561. PATENTED MAR. 12, 1907.
W. V. GILBERT.
SPRING DEVICE FOR PRODUCING DIFFERENTIAL MOVEMENTS.
APPLICATION FILED JUNE 23, 1906.
4 SHEETS—SHEET 1.
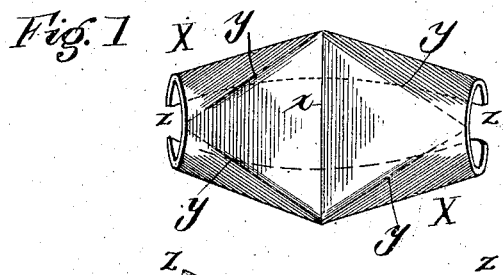
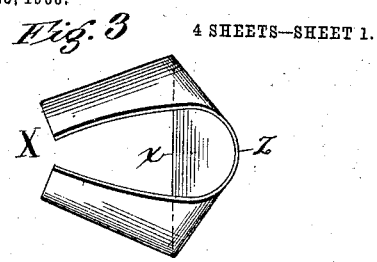
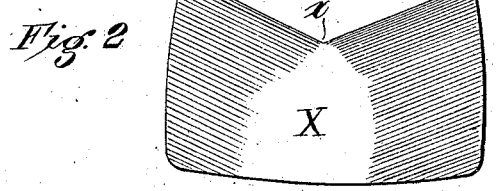
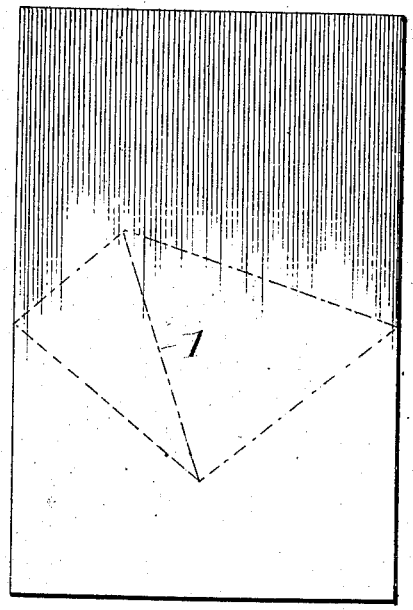
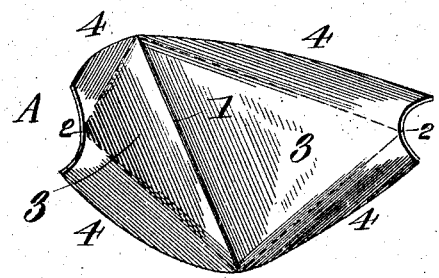
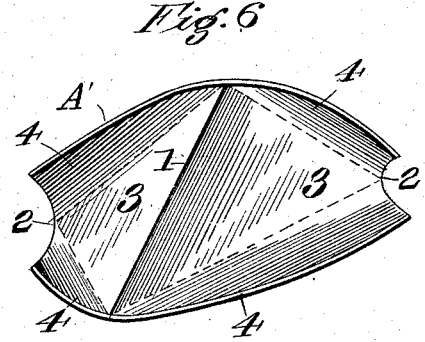
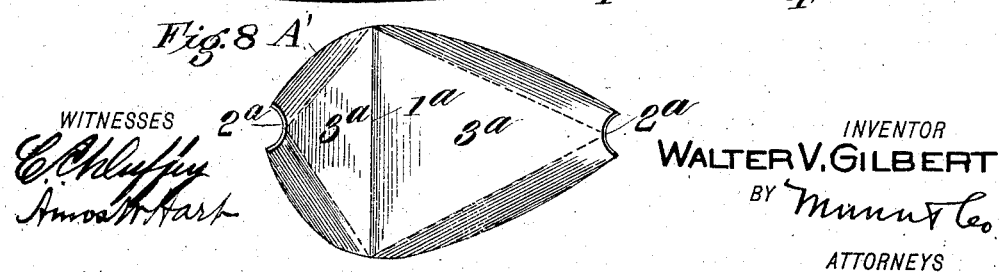
WITNESSES
INVENTOR
WALTER V. GILBERT
BY
ATTORNEYS No. 846,561. PATENTED MAR. 12, 1907.
W. V. GILBERT.
SPRING DEVICE FOR PRODUCING DIFFERENTIAL MOVEMENTS.
APPLICATION FILED JUNE 23, 1906.
4 SHEETS—SHEET 2.
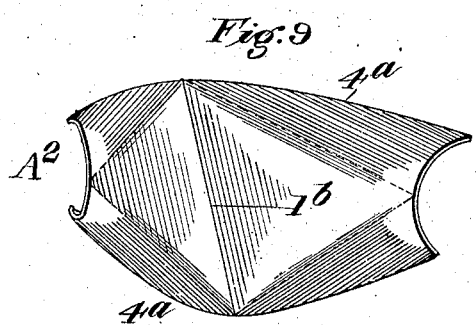
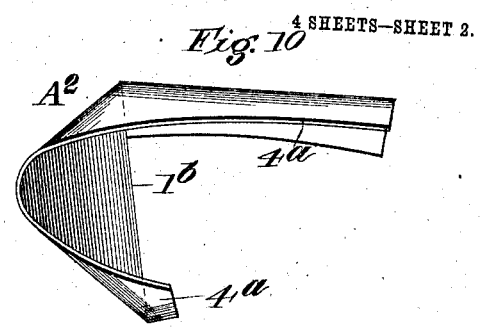
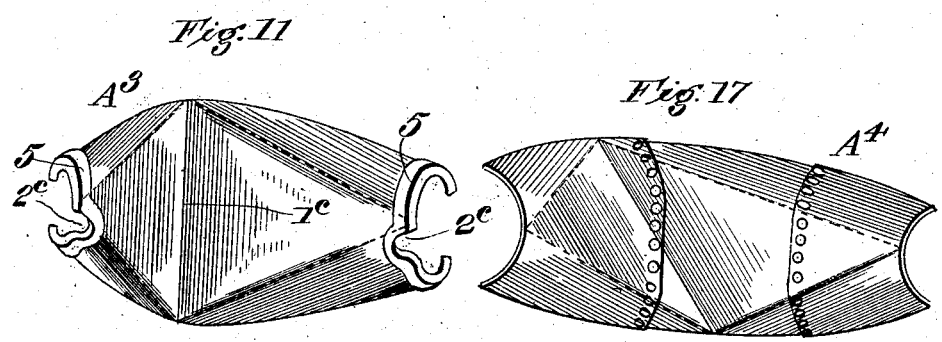
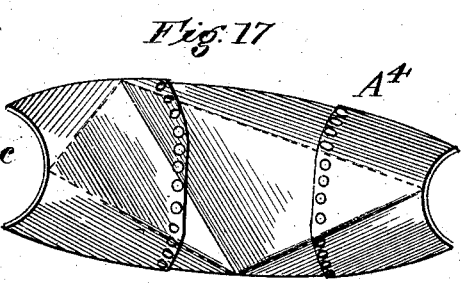
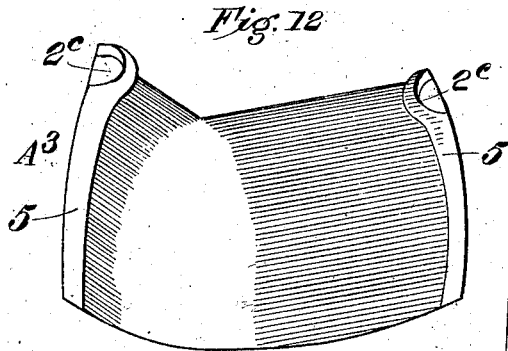
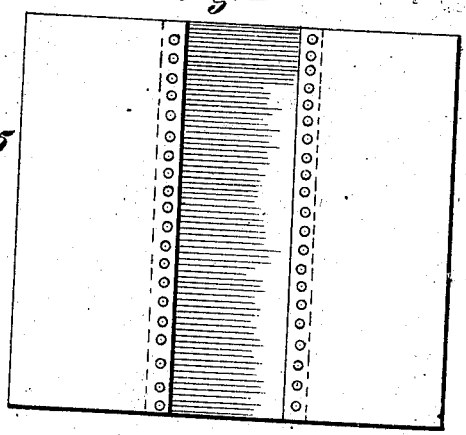
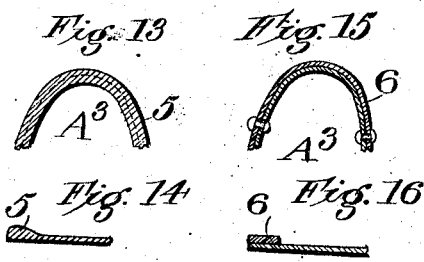
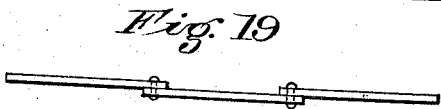
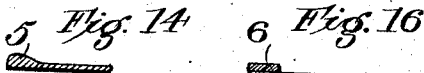
WITNESSES
INVENTOR
WALTER V. GILBERT
BY
ATTORNEYS No. 846,561. PATENTED MAR. 12, 1907.
W. V. GILBERT.
SPRING DEVICE FOR PRODUCING DIFFERENTIAL MOVEMENTS.
APPLICATION FILED JUNE 23, 1906.
4 SHEETS—SHEET 3.
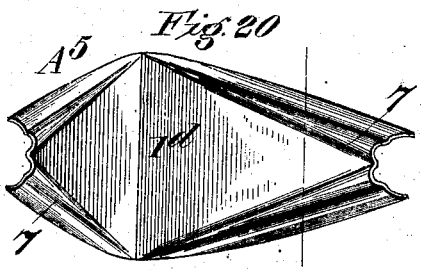
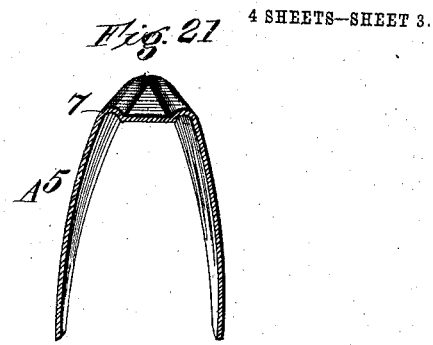
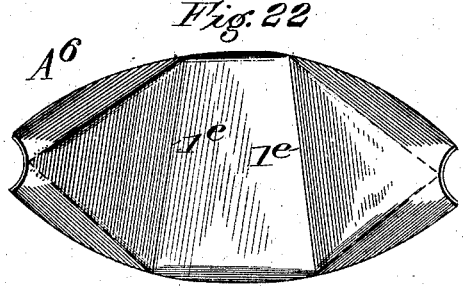
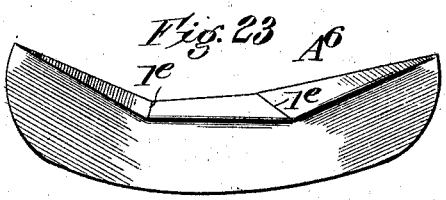
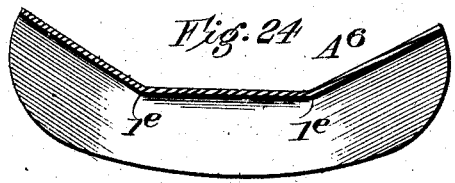
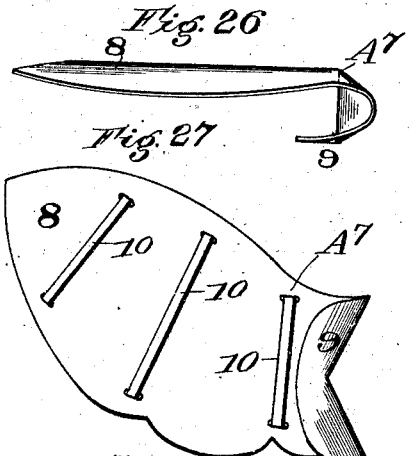
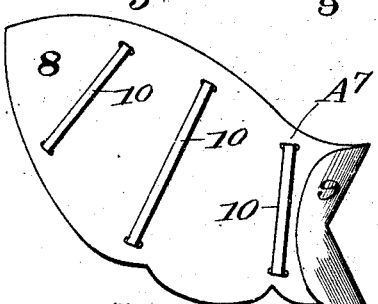
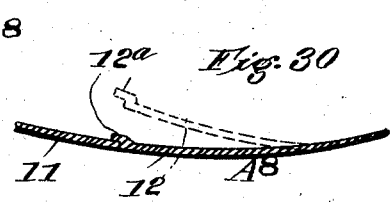
WITNESSES
INVENTOR
WALTER V. GILBERT
BY
ATTORNEYS No. 846,561. PATENTED MAR. 12, 1907.
W. V. GILBERT.
SPRING DEVICE FOR PRODUCING DIFFERENTIAL MOVEMENTS.
APPLICATION FILED JUNE 23, 1906.

4 SHEETS—SHEET 4.

WITNESSES

INVENTOR
WALTER V. GILBERT
BY
ATTORNEYS

UNITED STATES PATENT OFFICE.

WALTER VILLA GILBERT, OF LONDON, ENGLAND.

SPRING DEVICE FOR PRODUCING DIFFERENTIAL MOVEMENTS.

No. 846,561.　　　　Specification of Letters Patent.　　Patented March 12, 1907.

Application filed June 23, 1906. Serial No. 323,153.

*To all whom it may concern:*

Be it known that I, WALTER VILLA GILBERT, a subject of the King of Great Britain, residing in the city of London, England, have invented an Improved Spring Device for Producing Differential Movements, of which the following is a specification.

This device is an embodiment of variations of a basic invention for which I have filed, May 9, 1906, an application, Serial No. 316,047, for United States patent. The original device is formed from a thin metal plate or other blank of resilient material by bowing it in one direction and then indenting the back, bend, or bow of the same centrally and transversely at right angles to an imaginary line extending from end to end and centrally of the said back or bend. In the present invention the indent is located or arranged differently—that is to say, either at a point removed from the center of the back or bend of the folded plate or on a line inclined or oblique to the other diagonal extending between the ends of the back, or the ends of said indent may be differently distanced from said other diagonal. By such location or arrangements of the indent the operation of the sides or wings of the device, caused by the application of pressure centrally at the ends or apices of the same, is so modified or varied as to produce peculiar differential movements that adapt the invention for new or different functions and uses. In other words, the construction of the device becomes such that by compression the ends or apices of the same are caused to approach each other from their normal relative positions, and the side portions or wings that project from the indented back have or impart or allow motion in another direction or part or allow motion in another direction or a plurality or motions in various directions differentially, and upon said apices being released from compression and consequent actuation they recover their normal relative positions, and thus said wings, as also the back parts, have or impart or allow a corresponding differential motion or plurality of differential motions reciprocal to that or those due to the aforesaid compression, whereby the availability of the device for various industrial applications is considerably extended, as hereinafter indicated, by way of example.

The invention is illustrated in the accompanying drawings, in which—

Figure 32:
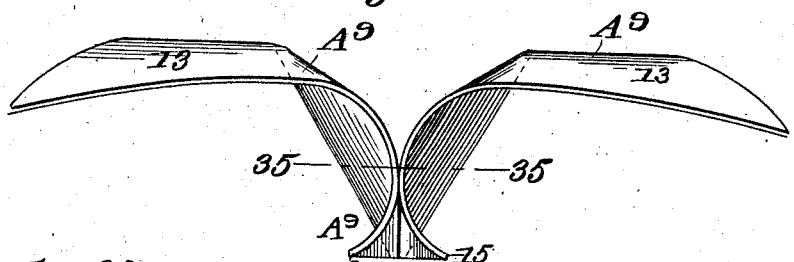
Figure 33:
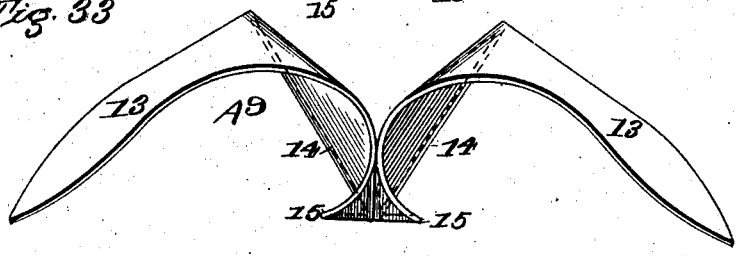
Figure 34:
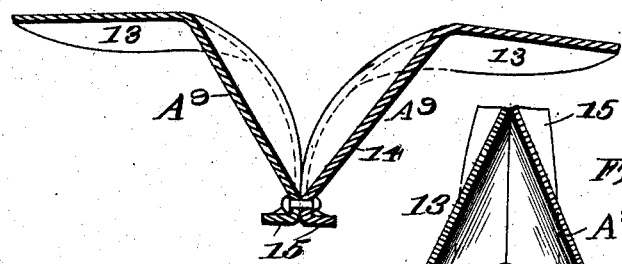
Figure 35:
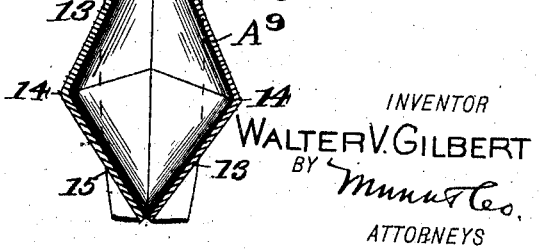

Figures 1, 2, 3 are respectively back, side, and end views of the original device upon which the present invention is an improvement. Figs. 4, 5, 6 are respectively a back, side, and front view of one form of my present invention. Fig. 7 is a plan view of a blank from which the device shown in Figs. 4, 5, 6 may be formed, the dotted lines appearing thereon indicating the lines of fold and indentation. Fig. 8 is a back view of another form or variation of the device constituting my present invention. Figs. 9 and 10 are respectively back and end views of a modification of the form shown in Figs. 4, 5, 6, one of the sides or wings of the same being shorter than the other. Figs. 11 and 12 are respectively back and side views showing a further modification. Figs. 13, 14 and 15, 16 are sectional views of portions of the device shown in Figs. 11 and 12. Fig. 17 is a back view of a modified form of the invention; and Fig. 18 is a plan view of a plate from which the device may be formed, the same being made in parts or sections riveted together. Fig. 19 is an edge view of the plate represented in Fig. 18. Figs. 20 and 21 are respectively back and sectional views of another modification. Figs. 22, 23, 24, and 25 are respectively a back view, a side view, a longitudinal section, and a cross-section of another modification. Figs. 26, 27, and 28 are respectively an end view, a plan view, and a cross-section of another modification. Figs. 29 and 30 are respectively a side view and a longitudinal section of another modification. Figs. 31 and 32 are respectively a top plan and end view of another modification. Fig. 33 is a view showing the position the sides or wings of the device shown in Figs. 31, 32 assume when the device is operated. Fig. 34 is a cross-section on the line 34 34 of Fig. 31. Fig. 35 is a horizontal section on the line 35 35 of Fig. 32.

As already indicated, the original spring device X (illustrated in Figs. 1, 2, 3) was formed of a resilient plate or blank by bowing it centrally and then indenting the fold or back at right angles to and bisecting the longer diagonal—to wit, an imaginary line extending centrally from end to end of the back. Such indent is indicated by *x* in said Figs. 1, 2, 3, and dotted lines *y*, Fig. 1, indicate a diamond-shape quadrilateral back formed of two equal and similar comparatively flat triangular portions whose bases meet or abut at the indent $x$ and whose apices are preferably constituted by and coincident with the bowed curved ends of the device. By applying pressure centrally to the said ends or apices $z$ of the device X the sides or wings of the latter are caused to move inward or toward each other, and upon release of the compression they recede from each other, all opposing movements being co-equal.

The construction of the device according to my present invention enables irregular or differential movements to be produced which were not possible with the original form X. Thus in one embodiment of the invention represented in Figs. 4, 5, 6, 7, the device A is provided with an indent 1, which is arranged at an inclination to the longer diagonal—to wit, an imaginary line connecting the ends or apices 2 2. Thus two comparatively flat triangular portions 3 are formed on opposite sides of the indent 1; but the same are dissimilar in form and unequal in area. Fig. 7 is a plan view of the blank from which the device A is formed, the quadrilateral, which is divided transversely by the indent 1, being indicated by dotted lines. Upon actuation of the ends or apices 2 of the device A the sides or wings 4 will have differential movements or approach and recede from each other differentially in place of approaching and receding from each other in the regular manner of the device X. (Illustrated in Figs. 1, 2, 3.)

Differential movements may also be produced when the device is constructed as indicated by A', Fig. 8, in which the indent $1^a$ is at right angles to the longer diagonal, but located nearer one end of the device than the other. In other words, the line of indentation $1^a$ is perpendicular to the longer diagonal, but not located centrally or equidistantly between the ends $2^a$. Thus two flat triangular portions $3^a$ are formed on opposite sides of the indent $1^a$; but the same are unequal in area and the longer diagonal does not bisect the said indent.

In the form $A^2$ (shown in Figs. 9 and 10) there is the same arrangement as in Fig. 4 as respects the indent $1^b$; but one of the sides or wings $4^a$ is made much shorter than the other, or, in other words, the upper wing is extended more than the lower one, and in consequence of this construction, as also the fact that the two diagonals of the back do not bisect, the device $A^2$ is well adapted to counterfeit the general formation and functions of a bird's wing or of apparatus where it is desired to attain a plurality of differential movements or trajectories.

The device thus constructed is adapted for aeronautical purposes, the upper wing in such case partaking of the character of that portion of a bird's wing which extends outward from the wrist-joint and the indent of the device partaking of the character of the more rigid body portion or part of the wing which is anterior to the wrist-joint, it being understood that the upper end of the indent and the parts contiguous thereto constitute such wrist-joint.

In order to further simulate a bird's wing, the upper extended wing may be made of a very light yielding or elastic construction, and the indented back portion may be of a comparatively rigid and strong construction. The upper wing may be furnished with feathers or representations of feathers, and the inner side of the indent may also be furnished with feather-like attachments whose outer ends may extend to or connect with the inner side of the upper wing. The back portion of the device $A^2$ may be so controlled that a fore-and-aft vertical section, as also a vertical section from base to tip of the upper wing, will present the curved beginning and tangential extension characteristic of a bird's wing. Assuming the normal position of the wing to correspond with such contour, upon applying pressure to the ends or apices of the device the triangular components of the back are caused to assume an acute or less obtuse angular relation, and thus the upper wing will have an outwardly and downwardly thrusting or clawing action which will be accentuated if the device is compressed at a point below the apices of the triangular components. Thus two marked differential movements or trajectories will be described—one by those parts of the back contiguous to the inner part of the wrist-joint about the other end of the indent as a center and the other movement by the extended wing about the wrist-joint as a center. In such case it may be desirable to actuate the device eccentrically, and to provide for this or for indicating the points at which compression is to be applied the ends or apices may be indented below or above the central line, as indicated at $2^c$, Figs. 11 and 12. In this case the device $A^3$ is shown provided with an indent $1^c$, which is at right angles to the longer diagonal, as in Fig. 8, instead of being inclined like $1^b$ in Figs. 9 and 10.

It will be understood that the return of the wing to its normal position will result automatically when compression is released; but it may of course be aided by mechanism that may be employed to actuate the wing. Differential resistances will be encountered in the downward and upward strokes of the wing, since in the downstroke the concave side of the wing will encounter a greater air resistance than the convex side in the upstroke.

In Figs. 11 and 12 the insets or notches $2^c$ are arranged directly opposite each other; but since it may be found desirable to actuate the device by applying pressure at different distances from or on either side of the back diagonal the insets may be arranged one at a greater distance than the other from the said diagonal which intersects the indent. Thus they may be arranged diagonally instead of diametrically opposite or at various other points more or less removed laterally from the diagonal, and when pressure is applied at such points the irregularity of the movements of the sides or wings will be still more pronounced.

The end edges of the device may be reinforced, as indicated in Figs. 11 to 16, inclusive. Thus the edge may be thickened, as at 5, (see especially Fig. 14,) or a separate strip may be attached by rivets or otherwise to the edge of the device, as indicated at 6 in Figs. 15 and 16. In brief, I propose to construct the reinforce in any preferred manner, either integral or separate from the body of the device. Such reinforce will assist the parts contiguous to or constituting the ends or apices of the device in retaining their shape and a certain degree of rigidity under all circumstances, but more particularly when the apices are subjected to compression for operating the device.

In Figs. 17, 18, and 19 I illustrate a device $A^4$, whose body is made in sections, the same being overlapped and riveted together. They may obviously be brazed together or secured in any other manner which may serve the purpose.

In order to increase elasticity and flexibility along the lines of jointure of the back and wings, I may construct the device $A^5$, as shown in Figs. 20, 21, with corrugations or crimps 7, the same extending from the ends of indent $1^d$ to the ends or apices, and preferably enlarging from the inner ends outward.

In Figs. 22 to 25 I show a device $A^6$ having a double indent—that is to say, an indent $1^e$ at two different points and on converging lines. Thus each indent is inclined to the end-to-end diagonal, and a flat surface intervenes them. It is obvious the two indents $1^e$ might be arranged parallel instead of inclined to each other and might also be perpendicular to the diagonal.

In Figs. 26 to 28, inclusive, I illustrate a form $A^7$, comprising an upper wing 8, which is much extended beyond the lower wing 9 and is also curved laterally and provided on its under side with a series of cross bars or strips 10, whose ends, as shown in Fig. 28, pass through the transversely-curved back of the wing and are provided on the outer side with knobs or are otherwise so constructed that they serve practically as means for stiffening the wing transversely.

In Figs. 29 and 30 I illustrate another form $A^8$, wherein one or both of the wings 11 are provided with a tongue 12, which, since the body of the device is formed of resilient material, is adapted to open and close when the device is actuated. In other words, when the sides or wings 11 move toward each other the tongue 12 closes automatically—say by the resistance of the air; but when the wings move in the opposite direction the tongue opens and allows passage of matter through the opening. The free end of the tongue is provided with a lug or flange $12^a$ (see Fig. 30) to arrest the tongue when closed and prevent its passing outward beyond the slot.

In Figs. 31 to 35, inclusive, I illustrate a double spring device $A^9$, the same being formed of two juxtaposed and similar spring-plates, each constructed with a long upper wing 13, extended from the indented back 14, and the lower wings 15 being placed together and suitably connected—say centrally—by means of rivets or by any other means. When compression is applied to the ends of this double device, the wings are caused to vibrate, as will be understood by reference to Figs. 32 and 33, one of which shows a normal lateral extension of the opposite wings 13 and the other their downward deflection under the effect of actuating compression. It is of course to be understood that not only in this instance, but with relation to all of the other forms before described, the compression may be effected manually or actuating mechanism may be arranged to operate the wing or wings, and where a plurality of devices are being operated all may be actuated in unison or otherwise.

The device as described is adapted to have, impart, or allow motion, but may be utilized with certain modifications (more particularly that form of construction having a double indent) to distribute, counteract, absorb, or neutralize elasticity, motion, tension, or resistance.

In all forms of construction of the improved device, excepting that in which the broadened or doubled indent is adopted, the back thereof consists of other two diagonaled quadrilateral formations than those referred to in my application Serial No. 316,047—that is, of those having diagonals which intersect each other at right angles whether one bisects the other or neither bisects the other and whether in any such case they be of equal length or of different lengths and of those having diagonals which intersect each other obliquely or at an inclination whether they bisect each other or one bisects the other or neither bisects the other and whether in any such case they be of equal length or of different lengths, and the said differential movements may be obtained as required by utilizing the quadrilateral formation having diagonals appropriately proportioned and arranged.

It will be seen that by the construction of the spring device in any of the forms described or other analogous ones I am able to obtain differential movements of the two wings or of either wing relative to the other, or of either end or outer corner of each wing relative to the other end of the same, also of the triangular back components to each other.

It is to be understood that in practice the device will be used in various positions, inverted, inclined, or otherwise, as conditions may require.

What I claim is—

1. The spring device formed of a blank of resilient material in bowed shape and having its back indented transversely, each terminal of the indent being located farther from one end than the other of the said back, substantially as described.

2. The spring device formed of a blank of resilient material in bowed shape, its sides or wings being concave on the inner side and its back having a transverse indent whose terminals are each located farther from one end than the other of the said back, substantially as described.

3. The spring device formed of a blank of resilient material in bowed shape, its sides or wings being concave on the inner side and its back having a transverse indent, each terminal of the indent being located farther from one end than from the other end of said back, substantially as described.

4. The spring device formed of a blank of resilient material, the same having a bowed shape and the back indented upon a line inclined to the longer diagonal of said back, substantially as described.

5. The spring device formed of a bowed blank of resilient material whose opposing outwardly-projecting sides or wings are continuously curved from end to end, and a back with which said wings are united upon curved lines, the said back having an indent extending across it and two triangular components extending from the indent, each differing from the other in configuration, substantially as described.

6. The spring device formed of a resilient blank having a bowed shape and one of its opposing wings extended beyond the other, the back which connects the said wings being indented upon a line whose terminals are located at unequal distances from the ends of the back, substantially as described.

7. The spring device formed of a resilient blank having a bowed shape and one of its opposing wings extended beyond the other, the back which connects the said wings being indented upon a line that is inclined to the longer diagonal extending between the ends of the back, substantially as described.

8. The spring device formed of two resilient blanks each having a bowed shape and one of its opposing wings extended beyond the other, and the back which connects the differential wings being indented upon a line whose terminals are located at unequal distances from the ends of such back, the lower wings being placed together and connected so that the longer upper wings extend outward in opposite directions, substantially as described.

9. The spring device formed of a resilient plate in a bowed shape, the back which connects the sides or wings thereof having separated indents and the terminal of each indent being located farther from one end than the other of the said back, substantially as described.

10. The spring device formed of a resilient plate in bowed shape and having two outwardly-projecting, continuously-curved wings, the back which connects them having separated indents extending across it and arranged at an angle to each other, the two triangular portions of the back extending from the respective indents to the ends of the back, and a flat portion intervening the indents, substantially as described.

11. The spring device formed of a resilient blank having a bowed shape and one of its opposing wings extended beyond the other and the back which connects said wings being indented upon a line whose terminals are located at unequal distances from the ends of the back, and transverse braces applied to the under side of the longer wing and loosely connecting the side edges of the same, substantially as described.

12. The spring device formed of a resilient blank having a bowed shape and one of its opposing wings provided with a spring-tongue which normally closes an opening in the wing and means for preventing the said tongue from passing through the opening, it being free to open on the inner side of the wing, substantially as described.

13. The spring device formed of a resilient blank having a bowed shape and its back indented upon a line whose terminals are located at unequal distances from the ends of the back, the latter having insets located to the side of the longer diagonal of the back, substantially as described.

14. The spring device formed of a resilient blank having a bowed shape and its back being indented upon a line whose terminals are located at unequal distances from the ends of the back, the said ends being reinforced substantially as and for the purpose specified.

15. The spring device formed of a resilient blank constructed in sections which are rigidly connected, the back of such device being indented upon a line whose terminals are located at unequal distances from the ends of the back, substantially as described.

16. The spring device having a bowed shape and indented back provided with corrugations extending from the terminals of the indent to the ends of the back, as shown and described.

17. The spring device formed of a resilient blank in bow shape, its back being indented and the two triangular component surfaces thus produced being dissimilar in size and configuration, substantially as described.

18. The spring device formed in bow shape, of a blank of resilient material and having its back indented and the outline thereof being an irregular or distorted diamond shape, as described.

19. A spring device in bow shape and having an indented back, the terminals of the indent being located at different distances from the longer, intersecting diagonal, as shown and described.

20. A resilient device formed in bow shape and having opposing inwardly-concave sides or wings and an indented back which connects said wings, the line of said indentation thereof and the diagonal extending between the ends of the back intersecting, two triangular component surfaces dissimilar in configuration being thus formed on opposite sides of said indent, substantially as described.

WALTER VILLA GILBERT.

Witnesses:
SOLON C. KEMON,
J. MIDDLETON.